United States Patent [19]

Kiriazis et al.

[11] Patent Number: 5,654,091
[45] Date of Patent: Aug. 5, 1997

[54] PAPER-COATED LAMINATE, PROCESSES FOR ITS PRODUCTION AND ITS USE IN THE FURNITURE AND BOARD INDUSTRY

[75] Inventors: Leonidas Kiriazis, Münster; Stephan Schunck, Augsburg, both of Germany

[73] Assignee: BASF Lacke + Farben, AG, Muenster-Hiltrup, Germany

[21] Appl. No.: 446,779

[22] PCT Filed: Dec. 10, 1993

[86] PCT No.: PCT/EP93/03501

§ 371 Date: Jul. 11, 1995

§ 102(e) Date: Jul. 11, 1995

[87] PCT Pub. No.: WO94/13176

PCT Pub. Date: Jun. 23, 1994

[30] Foreign Application Priority Data

Dec. 11, 1992 [DE] Germany ............... 42 41 834.8

[51] Int. Cl.$^6$ ............... B32B 5/16; B32B 23/08; B29C 47/00
[52] U.S. Cl. ............... 428/332; 428/507; 428/510; 428/511; 428/514; 428/515; 428/520; 428/537.5; 156/244.27; 156/243; 156/244.11; 156/325
[58] Field of Search ............... 428/332, 510, 428/520, 507, 511, 514, 515, 537.5; 156/244.27, 243, 244.11, 325

[56] References Cited

U.S. PATENT DOCUMENTS 5,243,126  9/1993  Chow et al. ............... 174/35 MS

FOREIGN PATENT DOCUMENTS

| 2035001 | 1/1991 | Canada. |
|---|---|---|
| 0429253A2 | 11/1989 | European Pat. Off. ........ B32B 21/02 |
| 81 05088 | 3/1981 | France. |
| 88 00 653.0 | 1/1988 | Germany. |

*Primary Examiner*—Leszek Kiliman

[57] ABSTRACT

A laminate comprising a substrate, a thermoplastic film, a paper layer, and a surface-finishing coating is described. The thermoplastic film is a coextruded, three-layer plastic film. The outer layers of the plastic film contain one or more polyolefins having a carboxyl group content of 0.05 to 30% by weight, and the inner layer of the plastic film contains polyethylene, polypropylene, and polyethylene copolymer, or a polypropylene copolymer. The laminates may be produced in one or more process steps and are useful for the manufacture of furniture and boards.

19 Claims, No Drawings

PAPER-COATED LAMINATE, PROCESSES FOR ITS PRODUCTION AND ITS USE IN THE FURNITURE AND BOARD INDUSTRY

The present invention relates to a laminate comprising a substrate, a thermoplastic film and a paper layer. The invention also relates to processes for the production of the laminate and its use in the furniture and board industry.

Impregnated papers which, when pressed onto boards, represent preliminary processing in the sense of priming (primer sheet) or frequently also display a decorative effect (decorative sheet) have long proved their worth in the furniture and board industry. The shortage and increase in cost of genuine veneers have very substantially contributed towards a greater use of the latter sheets. After being pressed onto chipboards or hardboards, the sheets have to be coated because, otherwise, the surface effect is insufficient.

In the course of the simplification of the production procedure, an improved type of impregnated papers, the finish sheet, has been increasingly used. These are impregnated single-colour or printed paper sheets which are provided with a coat by the sheet producer. The resulting finish sheets and continuous edges (continuous edge coating) are delivered on wheels to the furniture and board industry, where they are glued to substrates, such as, for example, chipboards or hardboards, under the action of heat and/or pressure. Surfaces which, as a rule, require no further coating, that is to say are further processed directly from the press, are obtained in this manner.

Known laminate systems are those which are prepared by adhesively bonding a surface-finished paper, i.e., a paper which has been, for example, coated, to a substrate which consists of chipboards or other woodworking materials. The adhesives usually used are urea glues, which have the disadvantage of formaldehyde emission and are therefore ecologically unsafe. When conventional chipboards are used as the substrate, the roughness of the surface is often so great that the substrate first has to be filled. However, this filling involves an additional process step, making the process complicated and the finished product considerably more expensive. The known paper-coated laminate systems therefore require improvement from the ecological and economic point of view.

SU-A-589138 discloses a process for coating woodworking materials with polyethylene films, the woodworking material coated with the polyethylene film being pressed with a decorative layer, in particular with a paper impregnated with a modified melamine/formaldehdye resin. The thickness of the polyethylene films used is 0.05 mm and 0.25 mm.

The disadvantages of the laminates described in SU-A-589138 are the relatively high formaldehyde emissions and the poor adhesion of the polyethylene film to the substrate.

Finally, JP-A-50-87480 relates to decorative laminate systems which are obtained by adhesively bonding an impregnated paper laminate to a thermoplastic PVC film, ethylene/vinyl acetate copolymers being used as adhesives.

It was therefore the object of the present invention to provide paper-coated laminates based on woodworking materials, which should have visually satisfactory surface structures even without the use of a filler. The resistance of the surfaces of the laminates to various reagents, for example foods, such as beer, coffee and the like, and the scratch-resistance of the coatings should be very good; furthermore, the adhesion between the substrate and the surface-finished paper should be excellent. In addition, it should be possible to dispense with impregnation of the papers used in the production of the paper-coated laminates. For ecological reasons, the laminates should have no formaldehyde emission. Furthermore the laminates should be capable of being produced readily and economically, a production process which is as simple as possible being desirable.

The object of the invention is achieved, surprisingly, by laminates comprising a substrate, a thermoplastic film, and a paper layer. The laminates are characterized in that they are composed of
A) a substrate,
B) a thermoplastic film which is applied thereon, either contains an adhesion promoter or consists of an adhesion promoter or is bonded to the substrate A) and the paper layer C) by means of an adhesive,
C) a paper layer and
D) a surface-finishing coating applied thereon.

DETAILED DESCRIPTION

Suitable substrates A) are woodworking materials, such as chipboards and hardboards, as well as MDF boards.

The component B) is a thermoplastic film which contains an adhesion-promoting plastic, consists of an adhesion-promoting plastic, or is bonded to the substrate A) by means of an adhesive.

The adhesion-promoting plastics used may be copolymers, graft copolymers, and ionomers, with the proviso that they have carboxyl or anhydride groups or groups which can be hydrolyzed to carboxyl groups and that the melt flow index of the polymers is between 0.1 and 30 g/10 min, measured at 190° C. and a load of 2.16 kg. Suitable co- or terpolymers can be prepared by copolymerization of, for example, ethylene with $\alpha,\beta$-unsaturated carboxylic acids, the corresponding anhydride, or the corresponding esters or half-esters having 1 to 8 C atoms in the alcohol radical. The corresponding salts of the stated carboxylic acids, for example the sodium, potassium, lithium, magnesium, calcium, zinc, and ammonium salts, can also be used. The carboxylic acids and their anhydrides are preferably used. Moreover, further monomers copolymerizable with ethylene and propylene and the unsaturated carbonyl compounds may be used in the copolymerization. For example, $\alpha$-olefins having 3 to 10 C atoms, vinyl acetate, and vinyl propionate are suitable.

The amounts of the monomers used are chosen so that the polymer formed has a carboxyl group content of 0.05 to 30% by weight, preferably 2 to 20% by weight. Copolymers of ethylene with $\alpha,\beta$-ethylenically unsaturated carboxylic acids and/or their anhydrides or copolymers of propylene with $\alpha,\beta$-ethylenically unsaturated carboxylic acids and/or their anhydrides or propylene homo- and/or copolymers grafted with ethylenically unsaturated carboxylic acids and/or their anhydrides are particularly suitable for the production of the thermoplastic film B).

The thermoplastic film B) may also contain mixtures of the adhesion-promoting plastics with other plastics modified to render them nonpolar, such as polyethylene or polypropylene homopolymers. In this case, mixtures of adhesion-promoting plastics and further plastics modified to render them nonpolar are extruded for the production of a plastic film B). It is particularly advantageous if copolymers of ethylene, acrylic acid and/or methacrylic acid and of an ester or several esters of acrylic acid and/or methacrylic acid with monoalcohols having 1 to 8 carbon atoms are used for the production of the thermoplastic film B).

The polyolefin copolymers are prepared by conventional, customary polymerization processes, for example by the high pressure polymerization process.

Examples of polyethylene adhesion promoters for the production of the plastic film B) are copolymers of ethylene which are obtainable from more than 60% by weight of ethylene, up to 10% by weight of α,β-unsaturated monocarboxylic acids and further comonomers. Such polyethylene adhesion promoters and their preparation processes are described, for example, in DE-A-25 24 274 and in DE-A-26 17 411.

Further suitable ethylene copolymers containing COOH groups are described, for example, in DE-A-34 04 744. These are terpolymers of ethylene comprising 100 mol of polymerized ethylene, 1 to 5.5 mol of polymerized $C_1$–$C_8$-alkyl esters of $C_3$–$C_6$-alkenecarboxylic acids and 1 to 3.2 mol of polymerized $C_3$–$C_6$-alkenecarboxylic acids.

The preparation of the ethylene terpolymers can be carried out by conventional customary high pressure polymerization processes (cf. Ullmann Enzyklopädie der Technischen Chemie, 4th Edition, Volume 19 (1980), pages 169–175, Verlag Chemie GmbH, 6940 Weinheim).

According to DE-A-34 04 744, the ethylene copolymers described there are prepared in tube reactors and autoclaves. The $C_3$–$C_6$-alkenecarboxylic acids used for the preparation of the terpolymers are α,β-ethylenically unsaturated carboxylic acids having 3 to 6 carbon atoms, such as, for example, acrylic acid, methacrylic acid, ethacrylic acid, crotonic acid, itaconic acid, aconitic acid, maleic acid or its anhydride, citraconic acid or its anhydride, methyl hydrogen maleate and methyl hydrogen fumarate. Acrylic acid and methacrylic acid are preferred.

Suitable esters of $C_3$–$C_6$-alkenecarboxylic acids are esters of alcohols of 1 to 8 carbon atoms with the alkenecarboxylic acids described above. n-Butyl acrylate is preferably used. Mixtures of different esters of the $C_3$–$C_6$-alkenecarboxylic acids may also be used.

Further suitable copolymers of ethylene with alkenecarboxylic acids are described, for example, in U.S. Pat. No. 3,520,861 and GB-A-2091745.

The acid-modified polyethylenes suitable for the production of the plastic film B) are available on the market, for example, under the name Lucalen® (BASF AG).

Other adhesion-promoting plastics which are suitable for the production of the plastic film B) are acid-modified propylene copolymers. These are copolymers of propylene with the $C_1$–$C_8$-alkyl esters, described above, of $C_3$–$C_6$-alkenecarboxylic acids and $C_3$–$C_6$-alkenecarboxylic acids.

Other suitable adhesion-promoting plastics for the production of the plastic film B) are graft copolymers which can be prepared by grafting at least one polymer from the group consisting of the polyolefins with up to 10% by weight, preferably up to 5% by weight, based on the total weight of the monomers, of at least one monomer from the group consisting of the α,β-ethylenically unsaturated carboxylic acids, their anhydrides, their esters or salts, in the presence or absence of peroxides. Examples are polypropylene random copolymers, polypropylene block copolymers, and polypropylene homopolymers grafted with ethylenically unsaturated carboxylic acids and/or their anhydrides. These adhesion-promoting plastics are known in large number and are commercially available. They are prepared by grafting ethylenically unsaturated carboxylic acids or their anhydrides onto homo- and/or copolymers of propylene in conventional extruders or mixers. Examples of graft polypropylenes are described in the publications DE-A-36 39 564, EP-A-385 645, U.S. Pat. No. 4,957,820, U.S. Pat. No. 4,980,210 and EP-A-312 306. Grafted polypropylenes are available on the market, for example under the name Novatec® 196 AP (Mitsubishi Chem.).

Ionomers which can be prepared, for example, by copolymerization of ethylene or propylene and, if required, further monomers with salts of α,β-unsaturated carboxylic acids or by partial neutralization of the carboxyl-containing copolymers and graft copolymers already described above with salts, oxides and hydroxides of sodium, potassium, lithium, magnesium, calcium, zinc, and ammonium, are also suitable for the production of the plastic film B). The neutralization may be carried out in the melt or in the solution. The amount of basic compounds is chosen so that the degree of neutralization of the polymers is between 0.1 and 99%, preferably between 0.1 and 75%.

The thermoplastic films B) are obtained by extrusion of the corresponding plastic granules. These are known processes (blowing process, chill-roll process, etc.).

According to the present invention, the adhesion promoters used for the production of the plastic film B) can, if required, be used together with plastics which have no adhesion-promoting properties. In order to achieve good adhesion between the substrate A) and the paper layer C), it is, however, necessary for the content of unsaturated carboxylic acid or its derivatives to be at least 0.05% by weight.

According to the present invention, the thermoplastic film B) which contains an adhesion promoter or consists of an adhesion promoter may contain customary additives, such as, for example, internal and external lubricants, antiblocking agents, stabilizers, antioxidants, crystallization aids, and the like. These additives are used in the amounts necessary for production, processing, compounding, and use, in the form of powders, dusts, beads, or a concentrate directly incorporated in the corresponding polymer. Further information on the customary used amounts and examples of suitable additives are given, for example, in the book by Gächter-Müller, Kunststoffadditive [Plastics Additives], Carl-Hauser-Verlag. The plastic films B) applied to the substrate A) are—as described above—monofilms which are obtainable from the adhesion promoter plastic, if necessary as a mixture with further plastics, such as polyethylene homopolymers or polypropylene homopolymers. However, the plastics film B) may also be a composite film which can be obtained by coextrusion of different plastics (coextrusion film). In this case, it is important that the two outer layers contain an adhesion-promoting plastic or consist of said plastic, since the two outer layers of a coextruded plastic film B) must generate the adhesion on the one hand to the substrate A) and on the other hand to the paper layer C) of the laminate.

Coextruded plastic film having the structure $B_1$-$B_2$-$B_3$ is advantageously used as the thermoplastic film B), where the plastics used for the production of the plastic layers $B_1$ and $B_3$ may be identical or different and are adhesion-promoting plastics selected from the group comprising the polyolefins modified to render them polar, and the plastic used for the production of the plastic layer $B_2$ consists of polyethylene homo- and/or copolymers or polypropylene homo- and/or copolymers. The adhesion-promoting plastics used for the production of the layers $B_1$ and $B_3$ are the same as those already described above for the production of the monofilm B). Copolymers of ethylene, acrylic acid, and/or methacrylic acid and one or more ester(s) of acrylic acid and/or methacrylic acid with monoalcohols having 1 to 8 carbon atoms are particularly preferably used for the production of the plastic layers $B_1$ and $B_3$ of the coextruded plastic film B), and polyethylene homopolymers are particularly preferably used as layer $B_2$ of the coextruded plastic film. Suitable polyethylene homopolymers are low density polyethylene (LDPE), medium density polyethylene (MDPE), high density polyethylene (HDPE), and linear low density and linear very low density polyethylene (LLDPE, VLDPE). Suitable homopolymers of polyethylene are, for example, the high density, medium density and low density, polyethylenes available under the trade name Lupolen® (BASF).

The layer thickness of the monofilms and coextrusion films used as component B) are at least 5 µm. If the layer thickness is less than 5 µm, surface roughnesses of the substrate can no longer be compensated, so that the use of a filler may be necessary. The layer thickness of B) is preferably in the range from 20 µm to 150 µm, depending on the roughness of the substrate A).

If it contains no adhesion-promoting plastic, the thermoplastic film B) may also be bonded to the substrate A) and to the paper layer C) by means of an adhesive. Adhesives are to be understood as meaning organic solutions of an adhesive or aqueous solutions or dispersions of adhesives or radiation-curable adhesives. For example, the adhesives disclosed in EP-A-199 228 are suitable.

Any suitable method may be used for applying the adhesive. The adhesive is preferably applied by application from solutions or dispersions in water or organic solvents. The solutions or the dispersions have, as a rule, an adhesive content of 5 to 60% by weight. Suitable adhesives are, for example, thermoplastic resins, such as cellulose esters, cellulose ethers, alkyl esters or acrylates, polyamides, polyurethanes, and polyesters, as well as heat-curable resins, such as epoxy resins, urea/formaldehyde resins, phenol/formaldehyde resins, melamine/formaldehyde resins, and synthetic rubber.

The paper layer C) used in the laminate according to the invention may consist of impregnated, preimpregnated, or nonimpregnated papers and further substrates which can be used for decorative purposes. Urea resins and melamine resins, as well as acrylate resins and polyester resins, are usually used as impregnating agents. The papers are strengthened therewith so that they do not split open on cutting, drilling and milling. By the addition of suitable additives to the impregnating agents, it is also possible to influence the overcoatability of the papers.

According to the present invention, nonimpregnated papers are preferably used, for ecological reasons.

The paper layer C) is provided with a surface-finishing coating D) which is obtained, for example, from solvent-containing aqueous reaction finishes. Particularly preferably used film top coats D) are water-thinnable reaction finishes which, owing to their high reactivity, solidify during curing to such an extent that the surface no longer changes, ie. no longer flows, during the subsequent pressing process.

Examples of suitable finish systems are radiation-curable, i.e., UV- or electron beam-curable finish systems, nitrocellulose finishes, acrylate resins, and the like. Suitable radiation-curable finishes based on unsaturated polyesters, polyester acrylates, polyether acrylates, epoxide acrylates, and urethane acrylates, as well as aminoplast or phenol resins, are described in DE-A-29 47 597. Aqueous coating materials for finish sheets which are suitable as component D) according to the present invention are disclosed, for example, in DE-A-40 24 835, DE-A-40 01 672, DE-A-39 05 268, DE-A-37 05 255, DE-A-36 10 764 and DE-A-36 10 732. Aqueous coating materials which contain, as coating component I, water-thinnable melamine resins, if required water-thinnable urea resins, polyols and if required self-crosslinking polyacrylate dispersions and, as coating component II, an acidic curing catalyst are particularly preferred. The coating components I and II are preferably mixed immediately before application, and the resulting wet film is baked for a period of 8 s to 50 s at a temperature between 90° C. and 200° C. Regarding further details of the finishes which can be used as coating component D), reference may be made to the literature stated in this application. The surface-finishing coating D) is preferably obtained from heat-curable aqueous finishes or from radiation-curable finishes.

According to the present invention, thermoplastic monofilms or thermoplastic coextruded films are also suitable as surface-finishing coating D).

Examples of thermoplastic resin films D) are polyolefin films, polyamide films, polyester films, polyurethane films, polyvinyl chloride films, polyvinylidene chloride films, and polycarbonate films. The laminated films are obtained, for example, by extruding at least two of the abovementioned plastics together. Examples of suitable polyolefins are polyethylene homopolymers, polypropylene homopolymers, and copolymers of ethylene and propylene. Polyolefin plastics for the production of polyolefin films are commercially available, for example, under the following brand names:

Escorene, Lupolen, Lotader, Lacqtene, Dowlex, Primacor, Surlyn, Admer, Sclair, Stamylan, Lucalen, etc.

Examples of suitable polyamides are polyamide 6 (polyamide prepared from ε-aminocaproic acid), polyamide 6,6 (polyamide prepared from hexamethylenediamine and sebacic acid), polyamide 66,6 (copolyamide which consists of polyamide 6 and polyamide 6,6), polyamide 11 (polyamide prepared from ω-aminoundecanoic acid), and polyamide 12 (polyamide prepared from ω-aminolauric acid or from lauryllactam). Examples of suitable commercial products are Grilon, Sniamid and Ultramid.

Suitable polyester plastics for the production of the surface-finishing coating D) are, for example, polyethylene terephthalate and polybutylene terephthalate. Other polyesters based on terephthalic acid, isopthalic acid and phthalic acid and various polyols, such as, for example, polyethylene glycol and polytetramethylene glycols having different degrees of polymerization, are also suitable. Examples of suitable commercial products are Hostaphan, Melinex and Hostadur.

Depending on the adhesive power of the thermoplastic films which can be used as the surface-finishing coating, these films are adhesively bonded to the paper layer C) by means of a coextruded adhesion promoter which may consist, for example, of polyolefin modified to render it polar, or by means of the adhesives already described, which are disclosed, for example, in EP-A-199 228. However, depending on the choice of the plastic film, it is also entirely possible to dispense with an adhesion promoter and an adhesive layer.

For the purposes of the invention, it is of course also possible to apply a further coating or several further coatings to the surface-finishing coating D). When thermoplastic films are used as coating D), they must in this case first be pretreated, for example by means of corona discharge.

The laminates according to the invention, comprising the substrate A), the thermoplastic film B), the paper layer C), and the surface-finishing coating D), may be produced by various methods. Thus, it is possible to press a surface-finished paper layer onto the substrate A) with the aid of the plastic film B). In a further possible method, the paper coated with the surface-finishing coating D) is laminated with the plastic film B) and the laminate obtained is pressed onto, or laminated with, the substrate A). Furthermore the paper layer C) can be laminated on both sides with the surface-finishing coating D) and the plastic film B) in one process step, the laminate obtained being applied to the substrate A) in a second stage.

However, a production process in which components A), B), C) and D) are pressed or laminated in one process step to give the laminate according to the invention is preferred.

The thermoplastic film B) may also be processed by means of direct extrusion. Immediately when it emerges from the extrusion unit in the molten state, the thermoplastic intended for the production of B) is applied to the substrate A) or to the paper layer C).

For the production of the laminates according to the invention, the components A) to D) are usually pressed for a period of 5 to 30 s at 120° C. to 180° C. and a pressure of 5 to 20 kp/cm².

The paper-coated laminates obtained have visually satisfactory surface structures even without the use of a filler. The surfaces obtained have an outstanding resistance to various reagents, such as, for example, foods (DIN 68,861). The adhesion between the substrate A) and the surface-finished paper is excellent. In addition, the laminates exhibit no formaldehyde emissions and can be readily and economically produced.

The invention is illustrated in detail below with reference to Examples.

COMPARATIVE EXAMPLE 1

A preimpregnated decorative furniture sheet coated with an acid-curable aqueous finish is pressed onto a chipboard using a conventional urea-containing adhesive.
Pressing conditions:
30 s, 150° C., Bürkle press, 20 kP.
Result:
The roughness of the chipboard stands out. There is a considerable loss of gloss.

EXAMPLE 1

The process is as in Comparative Example 1, except that a thermoplastic acid-modified polyethylene plastic film (trade name Lucalen® A 3710, manufacturer: BASF AG) is used instead of the urea-containing adhesive. The layer thickness of the plastic film is 10 μm.
Pressing conditions:
30 s, 150° C., Bürkle press, 20 kP.
The surface of the laminate obtained is smoother than the laminate surface achieved in Comparative Example 1, but irregularities still occur. Virtually no loss of gloss is found.

EXAMPLE 2

The process is as in Example 1, except that the layer thickness of the thermoplastic film is 100 μm instead of 30 μm. The surface of the laminate obtained is smooth and has an outstanding appearance without the chipboard having to be filled beforehand.

EXAMPLE 3

The process is as in Example 2, except that, instead of the monofilm, a coextruded plastic film is used as component B). The coextruded plastic film is obtained by coextrusion of a polyethylene homopolymer having the trade name Lupolen® PE (BASF AG, layer thickness 150 μm) with the adhesion promoter Lucalen® 3710 (BASF AG, layer thickness 20 μm). The adhesion achieved is higher than the tensile strength of the laminate. A laminate having a high surface quality is obtained.

EXAMPLE 4

The process is as in Example 3, except that, instead of the coextruded plastic film, first a layer of the adhesion promoter (Lucalen® 3710 from BASF AG, 20 μm layer thickness), then a 150 μm thick layer of the polyethylene homopolymer having the trade name Lupolen® PE (BASF AG) and finally a 20 μm thick adhesion promoter layer (Lucalen® 3170 from BASF AG) are applied in succession.

The result corresponds to that of Example 3.

EXAMPLE 5

Examples 1–4 are repeated, except that a nonimpregnated paper (Japan paper) is used instead of the impregnated paper. The surface properties do not change as a result.

EXAMPLE 6

Example 1–5 are repeated, except that, instead of the aqueous, acid-curable coating (component D), the decorative paper is coated with a thermoplastic film based on polyethylene terephthalate (layer thickness 15 μm) or with a plastic film based on polybutylene terephthalate (layer thickness 20 μm). Outstanding surface properties are obtained.

What is claimed is:

1. A laminate, comprising
   A) a substrate,
   B) a thermoplastic film that is applied to the substrate,
   C) a paper layer, and
   D) a surface-finishing coating that is applied to the paper layer and, optionally, is bonded to the paper layer C) with an adhesive,
wherein the thermoplastic film B) is a coextruded plastic film having the structure $B_1$-$B_2$-$B_3$, wherein the layers $B_1$ and $B_3$ independently comprise one or more polyolefins having a carboxyl group content of 0.05 to 30% by weight, and further wherein the plastic layer $B_2$ comprises a polymer selected from the group consisting of polyethylene homopolymers, polyethylene copolymers, polypropylene homopolymers, polypropylene copolymers, and mixtures thereof.

2. A laminate according to claim 1, wherein the layers $B_1$ and $B_3$ independently comprise at least one member of the group consisting of:
   copolymers of ethylene with at least one member of the group consisting of α,β-ethylenically unsaturated carboxylic acids and their anhydrides;
   copolymers of propylene with at least one member of the group consisting of α,β-ethylenically unsaturated carboxylic acids and their anhydrides;
   polypropylene homopolymers grafted with at least one member of the group consisting of ethylenically unsaturated carboxylic acids and their anhydrides; and
   polypropylene copolymers grafted with at least one member of the group consisting of ethylenically unsaturated carboxylic acids and their anhydrides.

3. A laminate according to claim 1, wherein the layers $B_1$ and $B_3$ independently comprise copolymers of compounds selected from the group consisting of ethylene, acrylic acid, methacrylic acid, and esters of acrylic acid and methacrylic acid wherein the esterifying monoalcohols have 1 to 8 carbon atoms.

4. A laminate according to claim 3, wherein a polyethylene homopolymer is used as the layer $B_2$ of the coextruded plastic film.

5. A laminate according to claim 1, wherein the thickness of the thermoplastic film B) is in the range from about 20 μm to 150 μm, depending on the roughness of the substrate A.

6. A laminate according to claim 1, wherein the paper layer C) is a nonimpregnated paper.

7. A laminate according to claim 1, wherein the surface-finishing coating D) is obtained from heat-curable aqueous finishes.

8. A laminate according to claim 1, wherein the surface-finishing coating D) is obtained from a film selected from the group consisting of thermoplastic monofilms and thermoplastic coextruded films.

9. A process for the production of the laminate according to claim 1, wherein the components A), B), C), and D) are laminated in one process step.

10. A process for the production of the laminate according to claim 1, wherein the components A), B), C), and D) are laminated in at least two process steps.

11. A process according to claim 10, wherein a surface-finished paper is produced from the components C) and D) and is pressed onto the substrate A) with the thermoplastic film B).

12. A process according to claim 10, wherein the paper layer C) is coated in one step with the surface-finishing coating D) and the thermoplastic film B) and the laminate obtained is applied to the substrate A) in a second stage.

13. A process according to claim 10, wherein a surface-finished paper is produced from the components C) and D), said paper is laminated with the thermoplastic film B), and the laminate obtained is pressed with the substrate A) in a third stage.

14. A laminate according to claim 1, wherein the surface-finishing coating D) is obtained from radiation-curable finishes.

15. Furniture comprising the laminate according to claim 1.

16. Boards comprising the laminate of claim 1.

17. The laminate of claim 1, wherein the thermoplastic film applied to the substrate contains an adhesion promoter.

18. The laminate of claim 1, wherein the thermoplastic film applied to the substrate is composed of adhesion promoter.

19. The laminate of claim 1, wherein the thermoplastic film applied to the substrate is bonded to the substrate A) and the paper layer C) by means of an adhesive.

* * * * *